Oct. 14, 1969
L. F. CASTRO ET AL
3,472,275
FLOW REGULATOR APPARATUS
Filed July 28, 1967
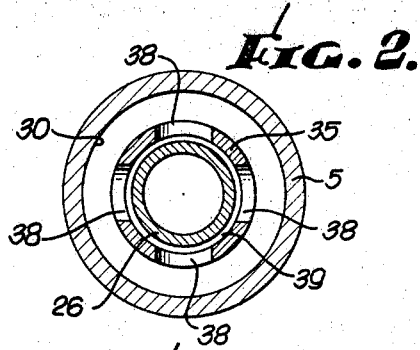
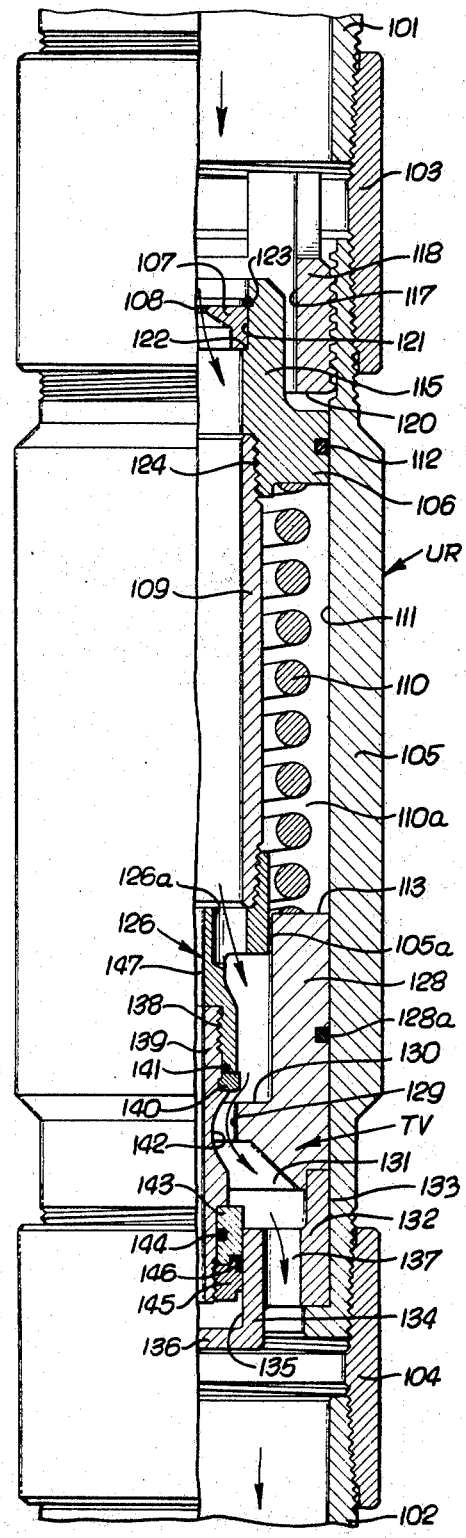
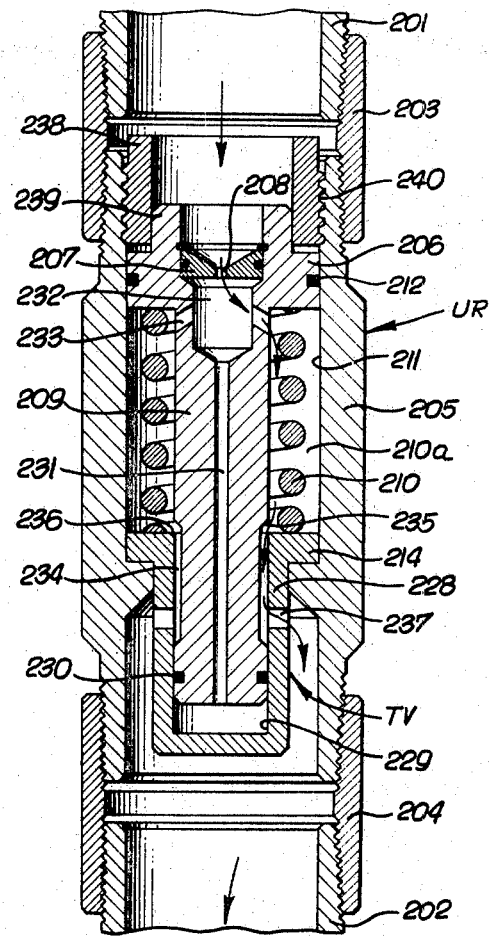
INVENTORS.
LUIS F. CASTRO
JULIAN D. KEITHAHN
KURT LEUTWYLER
JEROME H. ODEN
By Bernard Kriegel
ATTORNEY.

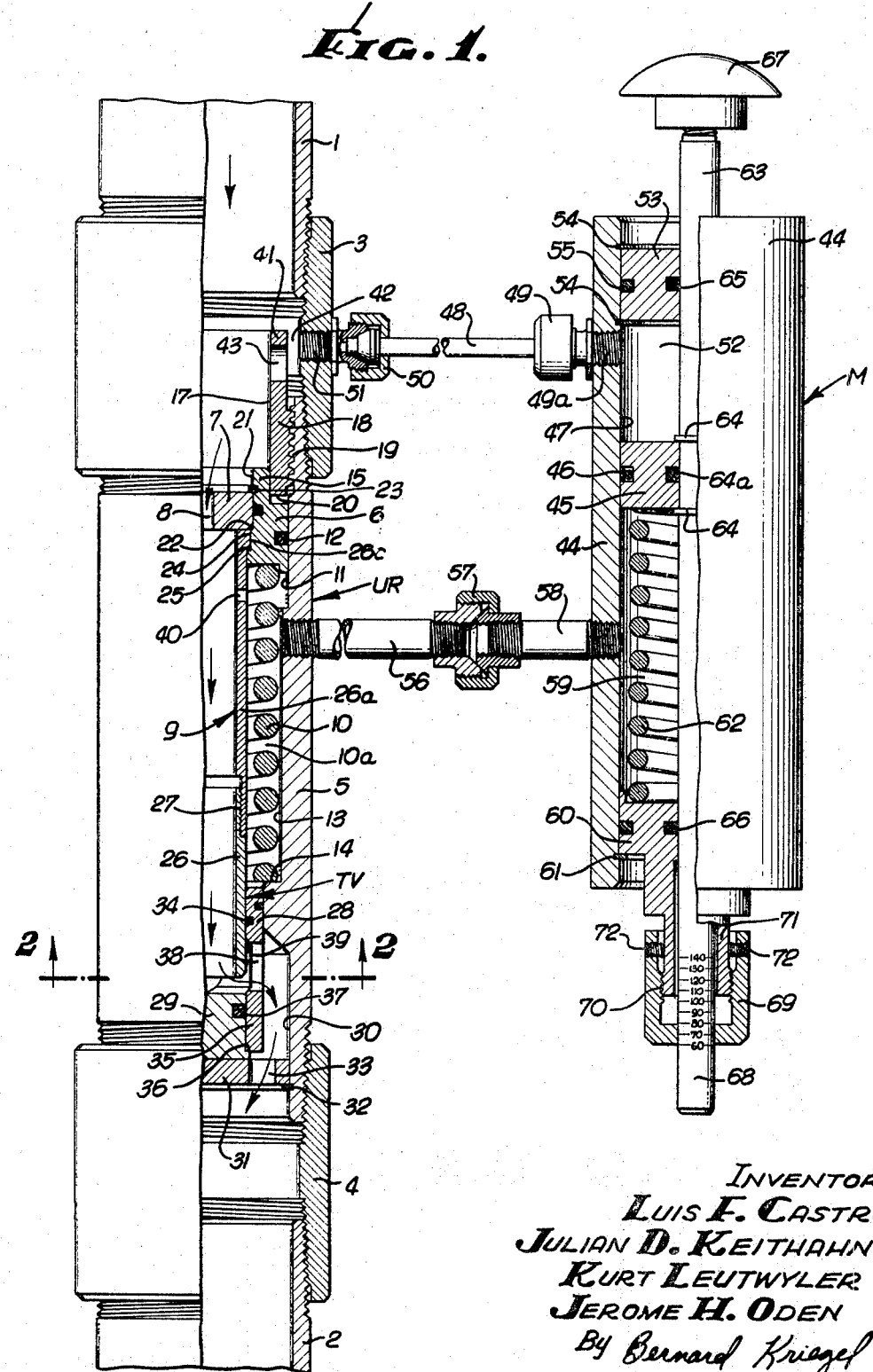

Oct. 14, 1969
L. F. CASTRO ET AL
3,472,275
FLOW REGULATOR APPARATUS
Filed July 28, 1967
3 Sheets-Sheet 3
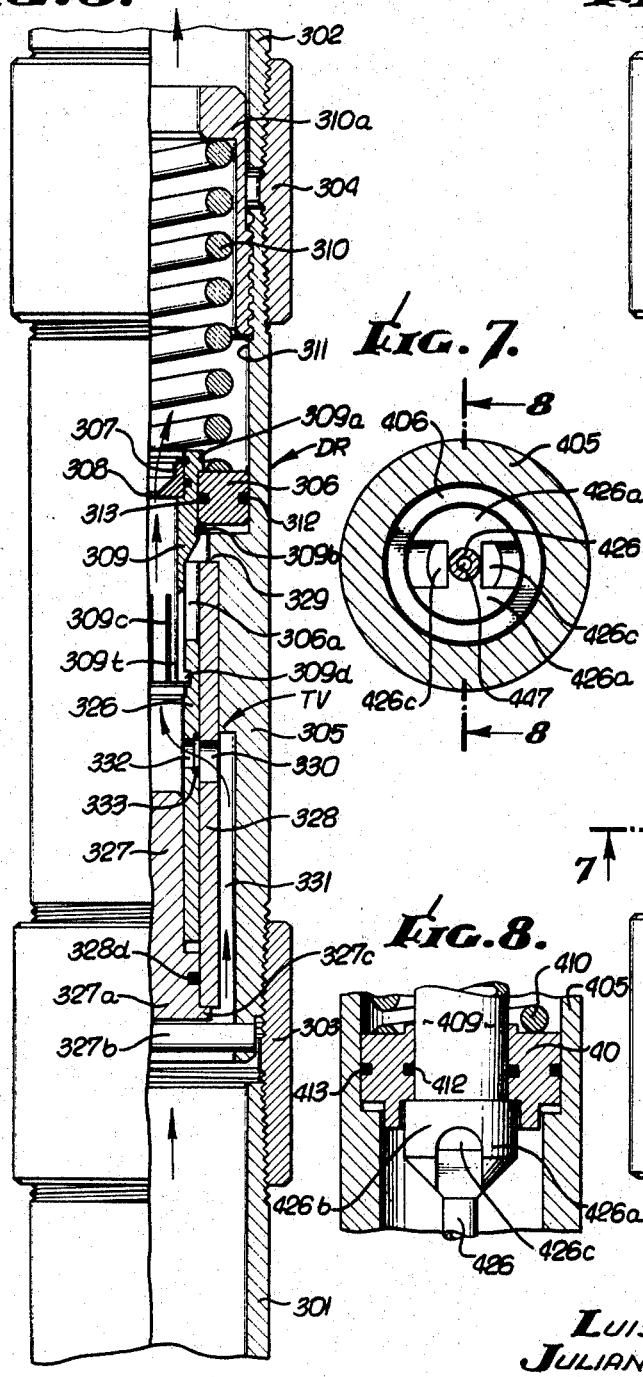
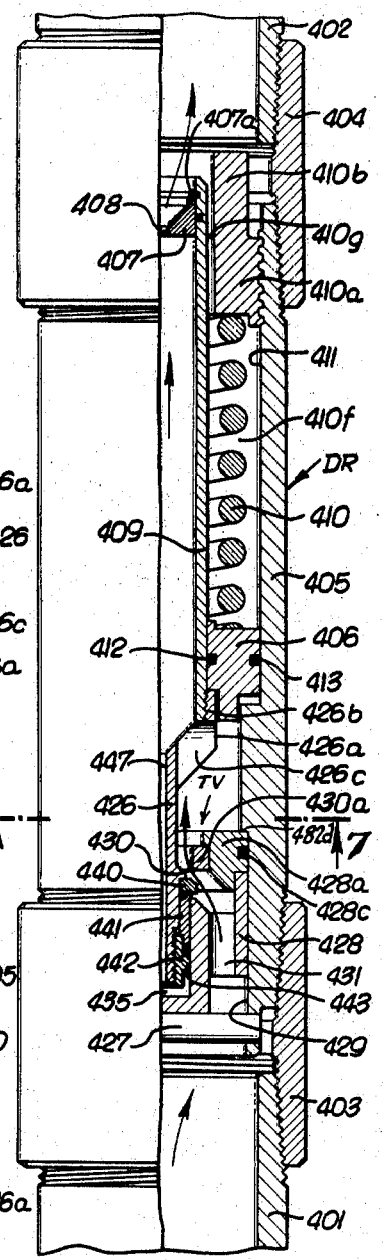
INVENTORS.
LUIS F. CASTRO
JULIAN D. KEITHAHN
KURT LEUTWYLER
JEROME H. ODEN
BY Bernard Kriegel
ATTORNEY.

United States Patent Office 3,472,275
Patented Oct. 14, 1969

3,472,275
FLOW REGULATOR APPARATUS
Luis F. Castro, Houston, Tex., Julian D. Keithahn, Downey, Calif., and Kurt Leutwyler and Jerome H. Oden, Houston, Tex., assignors to Baker Oil Tools, Inc., City of Commerce, Calif., a corporation of California
Filed July 28, 1967, Ser. No. 656,765
Int. Cl. F16k 31/163, 31/36, 3/26
U.S. Cl. 137—551       12 Claims

ABSTRACT OF THE DISCLOSURE

A flow regulator in which an orifice or choke is provided in a relatively large, spring-biased, pressure responsive piston for positioning a throttle valve in response to tendency of the rate of flow therethrough to change. The regulator may be included in combination with a differential flow meter.

---

The present invention relates to flow regulators, and more particularly to flow regulators of the type wherein a piston operated throttle valve is combined with an orifice device interposed in the fluid stream, and a spring acts on the device tending to move the valve in one direction, the fluid stream providing a force acting against the spring to move the valve in the other direction.

In flow regulators of the general type referred to above, particularly when the regulator is to be employed in service involving erosive fluids, such as, for example, well fluids carrying entrained particles, problems have been encountered in respect of serious erosive damage on the one hand and orfice blockage on the other hand.

Accordingly, an object of the present invention is to provide a flow regulator which is so constructed that the tendency toward this blockage and malfunction, as well as the tendency toward erosive damage are minimized. More specifically, the present invention provides, in combination with a throttle valve means, a choke or orifice member carried by a throttle valve operating piston, which oriffice member has a single large orifice therethrough so as to reduce the tendency to both blockage by particulate material and erosive wear. In addition, in accordance with the present objective, there is provided a piston for effecting positioning of the throttle valve means under the influence of pressure of the fluid acting to move the throttle valve means in one direction, and a comparatively large or forceful spring acting to move the throttle valve means in the other direction, wherein the piston area of the valve is comparatively large for an assembly of the type involved. Therefore, the spring may be comparatively forceful so as to eliminate the tendency of the throttle valve means, as well as the tendency of the piston, to become stuck or partially immobilized by virtue of the presence of particles in the fluid, or other substances, which may tend to impede movement of the piston and of the throttle valve means.

Still another object of the invention is to provide a flow regulator construction including a throttle valve means and a spring-loaded piston for effecting positioning of the throttle valve means, in combination with indicator means of the differential pressure type, the indicator means having pressure pickup locations upstream and downstream of the regulator valve piston and the orifice device forming a part thereof, and the pressure pickup locations of the indicator means being shielded from the effects of velocity pressures, that is to say, being so located as to pick up substantially static fluid pressure at opposite sides of the throttle valve piston.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense, since the scope of the invention is best defined by the appended claims.

Referring to the drawings:
FIGURE 1 is a view, partly in elevation and partly in longitudinal section, illustrating a flow regulator in accordance with the invention combined with a differential pressure indicator device;
FIG. 2 is a view in transverse section taken on the line 2—2 of FIG. 1;
FIG. 3 is a view, partly in elevation and partly in longitudinal section, illustrating a modified form of a flow regulator device embodying the invention;
FIG. 4 is a view in longitudinal section illustrating still another flow regulator device made in accordance with the invention;
FIG. 5 is a view, partly in elevation and partly in longitudinal section, illustrating still another regulator device made in accordance with the invention;
FIG. 6 is a view, partly in elevation and partly in longitudinal section, illustrating still a further regulator device made in accordance with the invention;
FIG. 7 is a view in transverse section taken on the line 7—7 of FIG. 6; and
FIG. 8 is a fragmentary view in longitudinal section taken on the line 8—8 of FIG. 7.

Referring first to FIG. 1, there is shown an upstream flow regulator device made in accordance with the invention and generally denoted at UR. This regulator is located in a fluid conduit, comprising an upstream conduit section 1 and a downstream conduit section 2, being connected thereto by threaded couplings 3 and 4, respectively.

The regulator UR comprises an elongate housing 5 in which is reciprocably disposed a regulator piston 6 having an orifice member 7 carried thereby provided with an orifice 8 therethrough through which fluid flowing from the conduit section 1 will pass into an elongate valve sleeve 9 having at its lower extremity, as seen in FIG. 1, throttle valve means, generally denoted TV, through which fluid will flow into the downstream conduit section 2 at a rate determined by the operation of the upstream regulator. This regulator includes a helical compression spring 10 acting to bias the regulator piston 6 and valve sleeve 9 in one direction against the force provided by fluid pressure acting on the effective cross-sectional area of the piston 6 to provide a force counter to the spring force.

More particularly, the housing 5 of the regulator UR comprises an elongate tubular member which is externally threaded at its opposite ends for connection to the respective couplings 3 and 4, and which adjacent its upper end, as viewed in FIG. 1, is provided with a cylinder or bore 11 in which the external cylindrical surface of the piston 6 is slidably and sealingly engaged, there being suitable piston ring or sealing means, comprising an O-ring 12, carried by the piston 6 and slidably engaged in the cylinder 11. Beneath the cylinder 11 is a bore 13 in the body 5 which has at its lower end an abutment 14 forming a seat for the lower end of the coiled compression spring 10. At its upper end, the spring 10 engages a piston 6 to provide an upward force, or force in an upstream direction, acting on the piston. This spring 10 is confined in the annular space 10a between the body 5 and the sleeve 9 depending from the piston 6.

The piston 6 has an axially extended skirt 15 projecting within a bore 17 provided by a sleeve 18 threadedly connected at 19 to the regulator housing 5, its lower extremity forming an abutment 20 engageable by the piston 6 to limit its upward movement. The piston 6 is of annular construction, in the illustrative embodiment now being described, and internally thereof includes a bore 21 therein terminating at its lower end in an abutment shoulder 22 against which is seated the orifice member 7, which is retained in the bore 21 of the piston 6 by a suitable snap or lock ring 23. Beneath the abutment shoulder 22 and within the piston 6 is a reduced bore 24 terminating in a shoulder 25 on which is seated an outwardly extending flange 26c provided at the upper end of the sleeve 9, the sleeve 9 thereby being retained in assembly with, or secured to, the piston 6 by the orifice disc 7 and the snap ring 23.

While the sleeve valve 9 may be of one piece, it is shown as including a lower end section 26 threadedly connected, as at 27, to the upper section 26a of the sleeve 9. The sleeve section 26 constitutes a portion of the throttle valve means TV, which also includes a cylindrical member or body 28 resting on a central support 29, the latter being maintained in an enlarged bore 30 within the lower end of the regulator housing 5 by a disc 31 which is secured in place within the chamber 30 by a snap ring 32 attached to the housing. The disc 31 has ports 33 to permit flow therethrough of fluid passing through the throttle valve means into the bore 30. The cylindrical member 28 constitutes a guide for the lower end of the valve sleeve section 26, a seal ring 34 on the housing 5 slidably sealing against the outside wall of the valve sleeve 26 to prevent by-pass of fluid therebetween. The cylindrical member 28 is disclosed as a separate element having a lower end portion 35 disposed about the support member 29 and seating on a shoulder 36 on the latter, there being a suitable seal ring 37 on the support member 29 engaging the lower portion 35 to prevent flow of fluid therebetween.

The cylindrical member 28 has a suitable member of circumferentially spaced radial ports 38 through which fluid may flow at a rate determined by the relative position of the valve sleeve 26 under the influence of the spring 10 and the pressure of fluid flowing through the regulator, as will be hereinafter more fully described. It will be noted at this point that within the region of the ports 38, the cylindrical valve member 28 has an internal annular groove or undercut 39 so that the lower extremity of the valve sleeve 26 is disposed in a slightly enlarged annular chamber, as distinguished from being slidable within an internal cylindrical wall at the points of flow of fluid through the ports 38, whereby to lessen the tendency of the fluid, which may contain erosive particles, to erode or cut away the valve components.

From the foregoing, it will now be apparent that the upstream flow regulator UR comprises the combination of the choke or orifice member 7 having the orifice 8 therethrough in a position upstream from the throttle valve means TV, with a relatively large diameter piston, with which the spring 10 is engaged, so that in the operation of the regulator, the spring 10 may be sufficiently forceful as to assure desired movement of the regulator valve sleeve 26. Moreover, the orifice member or disc 7 contains centrally of the piston 6 a single orifice 8 which may be of comparatively large diameter so as to not only reduce the erosive effects of high velocity fluid flow therethrough, but also to reduce any tendency of the orifice to plug with particulate material entrained in the fluid.

The regulator device will function in response to the relationship between the force of the spring 10 and the pressure acting upon the effective cross-sectional area of the piston 6 and orifice member 7. Therefore, if the pressure upstream of the orifice disc 7 should tend to increase, thereby providing a larger net force acting against the spring 10, the piston 6 and sleeve 9, together with its throttle valve sleeve section 26, will be moved downwardly and partially close off the effective flow area through the throttle valve ports 38, thereby tending to increase the pressure in the sleeve 9 below the orifice member 7. If the upstream pressure tends to decrease, the spring 10 shifts the piston 6 and sleeve 9 upwardly to increase the effective flow area through the ports. Accordingly, there is a tendency of the device to maintain a constant rate of flow therethrough due to the maintenance of a constant differential pressure across the orifice 8.

Ports 40 are provided through the valve sleeve 9 to establish fluid pressure communication between the interior of the sleeve downstream of the orifice disc 7 and the spring chamber 10a downstream of the piston 6. Accordingly, the fluid pressure upstream of the piston 6 and orifice member 7 acts thereon over the same area as the fluid pressure downstream of the orifice disc, which fluid pressure acts over the lower areas of the orifice disc 7, piston 6, and end surface of the valve sleeve portion 26. It is significant to note at this point that within the annular space or spring chamber 10a just referred to and to which fluid pressure is supplied through the ports 40, the fluid will be substantially static. In addition to this static pressure zone at the downstream side of the orifice disc 7 and piston 6, there is another substantially static pressure zone provided at the upstream side of the orifice disc 7. This latter static pressure zone is provided by an upward extension or skirt 41 of the piston guide 18, defining an annular space 42 between its outer wall and the inside wall of the coupling 3 between the end of the inlet conduit 1 and the housing 5. Into this static zone 42, fluid may pass through a suitable number of ports 43 in the skirt portion 41 of the piston guide 18, as well as around the upper end of the portion 41, but it will be understood that the predominance of flow will be centrally toward and through the orifice 8, the fluid within the annular zone 42 remaining substantially static.

In combination with the regulator as thus far described, there is also shown in FIG. 1 a differential pressure metering device M, which derives downstream pressure from the comparatively static zone or spring chamber 10a and which derives its upstream pressure from the comparatively static pressure zone 42. This metering device M, for illustrative purposes, comprises an elongate housing 44 having an annular piston 45 reciprocably disposed therein, which is provided with suitable sealing ring means 46 slidably engaged with the internal cylindrical wall 7 of the body. A conduit 8 is connected to the coupling 3 through a union 50 and fitting 51, and to the housing 44 through the union 49 and fitting 49a, establishing communication between the static pressure zone 42 upstream of the orifice disc 7 and an upstream pressure chamber 52 at the upper side of the meter piston 45, as seen in FIG. 1. This upstream chamber 52 is defined between the piston 45 and an end wall 53 within the housing 44 secured in place by spaced snap rings 54 carried by the housing, the end wall being sealed within the housing by a suitable seal ring 55. A conduit connects the spring chamber 10a with the downstream pressure chamber 59 in the meter housing. As shown, the conduit includes a section 56 threadedly secured to the regulator housing 5 and opening into the spring chamber 10a, a section 58 threadedly secured to the meter housing 44 and opening into the meter chamber 59, and a coupling 57 securing the sections 56, 58 to each other. The downstream pressure chamber 59 is defined between the meter piston 45 and an end closure 60 suitably secured in the housing by a snap ring 61 and providing a seat for one end of a compression spring 62, the other end of which spring abuts the piston 45 so as to provide an endwise bias toward upstream chamber 52.

Extending through the meter housing end closures 53 and 60 is a rod 63 suitably connected to the annular piston 45 by a pair of snap rings 64 and sealed thereto by a seal ring 64a. The rod is also slidably sealed in central openings in the respective end closures 53 and 60 by seal rings 65 and 66. A hand knob 67 may be secured to the upper end of the rod 63, and at the lower end of the rod 63 is a annular space 110a defined between the housing 105 and the sleeve 109.

Referring now to FIG. 4, there is illustrated a further upstream regulator construction UR, including, as in the previously described embodiments, a housing 205 connected at one end to an upstream or inlet conduit 201 by a coupling 203, and at its other end to a downstream or outlet conduit 202 by a coupling 204. Included in the regulator housing 205 is a regulator piston 206 provided with an orifice disc 207 having an orifice 208 therethrough. Depending from the piston is a stem 209 about which is disposed a coil spring 210, the stem 209 and the inner cylindrical wall or bore 211 of the housing 205 providing an annular space 210a for accommodating the spring 210, and providing a downstream pressure chamber beneath the piston 206, which is slidably disposed in the bore 211 and provided with a seal 212. At its lower end, the spring abuts a flange 214 at the upper end of a cup-like valve body 228 forming a part of the throttle valve means TV adapted to control the downward flow of fluid through the assembly, as viewed FIG. 4.

The valve body 228 includes an internal cylinder or bore 229 in which the end of the stem 209 of the piston 206 is reciprocably disposed and sealingly engaged, as by means of a seal ring 230. Extending axially through the stem is a passage 231 leading into the throttle valve cylinder 229 from a piston chamber 232 downstream of the orifice 208. Ports 233 in the stem lead from the chamber 232 into the housing 205 downstream of the piston 206. The flow of fluid from the annular space 210a in the housing between the bore 211 and the stem 209 is provided for by a circumferential groove or channel 234 formed about the outer periphery of the stem and extending axially upwardly, as viewed in FIG. 4, beyond the upper face of the flange 214 of the valve body 228, so that the upper wall 235 on the stem, defining the upper extremity of the circumferential groove 234, cooperates with the inner edge 236 of the flange 214 to provide a throttle valve opening through which fluid will flow downwardly and find access to suitable radial ports 237 leading from the valve body 228 into the housing, from where the fluid will flow into the downstream conduit 202.

At the upper end of the housing 205, as seen in FIG. 4, there is provided a guide bushing or sleeve 238 in which an upwardly extending cylindrical pilot portion 239 of the piston 206 is reciprocably disposed. The guide bushing 238 is threadedly adjustable at 240 in the housing 205 and provides, therefore, an adjustable stop for limiting upward movement of the piston in a direction which opens the throttle valve TV under the influence of the spring 210.

Thus, here again in the embodiment now being described, the pressure at the upstream side of the piston 206 will act upon the exposed cross-sectional area of the piston 206, including the annular area of the orifice disc 207, providing an axial force tending to close the pilot valve means TV; while the spring 210 and the pressure downstream from the orifice 208 acting on the entire piston area, including the annular piston area in the bore 211 and the annular area of the stem 209 in the chamber 229, will provide a counter force acting to open the throttle valve means TV. Accordingly, in the event that the pressure upstream of the orifice 208 should tend to increase, or the pressure downstream of the orifice tends to decrease, there will be provided a net force tending to close the throttle valve means TV, and thereby tending to increase the downstream pressure, maintaining a constant pressure drop across the orifice 208, and, therefore, a constant flow rate through the assembly. Conversely, a decrease in upstream pressure, or an increase in back pressure or downstream pressure, will have the reverse effect, that is, to open the throttle valve means TV and allow greater flow downstream of the orifice 208, whereby to tend to maintain a constant pressure drop across the orifice.

In FIG. 5, the invention is shown as embodied in a downstream flow regulator designated DR, in which, as will hereinafter more fully appear, the orifice device is downstream with realtion to the throttle valve means TV. In this embodiment, the regulator DR comprises a housing 305 connected to an upstream or inlet conduit 301 by a coupling 303 and a downstream or outlet conduit 302 by a coupling 304. Within the housing 305 is a regulator piston 306, an orifice disc 307 having an orifice 308 therethrough, throttle valve means generally denoted TV, and a spring 310 providing an axial force tending to move the throttle valve means in one direction, opposed by the pressure of fluid upstream of the orifice 308, but downstream of the throttle valve means, to move the throttle valve means in the other direction, whereby there will be maintained a substantially constant pressure drop across the orifice 308, and, therefore, a substantially constant flow rate through the device. The spring 310 bears against the piston 306 and a spring seat 310a threadedly secured to the upper end of the housing 305 and disposed within the coupling 304.

In this embodiment (FIG. 5), the piston 306 is shiftable in the housing bore 311 and secured to a longitudinally extending sleeve 309 by means of an end flange 309a on the sleeve and a snap ring 309b carried by the sleeve and engaging the piston 306 to hold the same in abutting engagement with the flange. The piston is further provided with a seal ring 312 sealingly engaged in the bore 311 within the housing, and with an additional seal ring 313 forming a seal between the piston and the sleeve. Forming a part of, and in the illustrative embodiment connected to, the sleeve 309 is a throttle valve sleeve 326 which extends axially and slidably engages an axially extended pilot stem 327 having a head 327a thereon which is abuttable with a cross pin 327b extended transversely of and secured to the housing 305, to limit movement of the pilot stem and head downwardly, as seen in FIG. 5. Upward movement of the pilot stem 327 is prevented by abutment of a radially outwardly extended flange 327c on the head 327a with the adjacent end of a cylindrical member or throttle valve body 328, which, in turn, abuts an inwardly extended flange 329 of the housing 305 below the regulator piston 306. Fluid leakage between the body 328 and head 327a is prevented by a seal ring 328d. The throttle valve body 328 has a suitable number of radial ports 330 therein leading between an annular space 331 within the body 305 and a suitable number of radial throttle valve ports 332 in the throttle valve sleeve 326. The sleeve 326 has a circumferential slot or groove 333 extended thereabout in the region of the ports 332 in communication therewith, as well as with the ports 330 in the valve body 328, providing a chamber tending to reduce the erosive effects of fluids and entrained solids passing through the throttle valve ports.

Means are provided for allowing access of fluid at upstream pressure, that is, at the pressure upstream of the orifice, but downstream of the throttle valve means TV, to the annular space 306a defined within the housing below the piston 306, as seen in FIG. 5. This means comprises longitudinally extended slots 309c in the sleeve 309, which slots also afford sufficient resilience to the plurality of fingers 309t defining the slots, so that such fingers and the radially outwardly extended lugs 309d on their free extremities essentially constitute a collet for effecting the connection between the sleeve 309 and the valve sleeve 326 previously referred to. Thus, the pressure upstream of the orifice 308 is adapted to act across the entire annular cross-sectional area of the piston 306 and the orifice disc 307, as well as the area of the sleeve 309 therebetween, to provide a force tending to move the same upwardly, as seen in FIG. 5, against the force provided by the spring 310 tending to move the same downwardly. The downward force of the spring is, of course, supplemented by the effect of fluid pressure downcalibrated end section 68 extending through a cap 69 threaded, as at 70, to an externally threaded neck 71 of the end closure 60. The cap 69 may be adjusted relative to the calibrations on the calibrated rod section 68 and locked in place by set screws 72, or the like.

It will now be apparent that the disposition of the rod 63 within the body 44, and hence the extent of endwise projection of the calibrated rod end section 68 from the reference cap 69, will be a function of the relationship between the upstream and downstream pressures acting, respectively, in the upstream chamber 52 and downstream chamber 59 of the meter housing 44 and the resistive force of the spring 62. Inasmuch as the upstream and downstream pressure sources for the meter M are both in relatively static regions or zones of the regulator UR, it will be appreciated that the meter M provides means for indicating accurately the relative pressure drop across the orifice 8 of the orifice disc 7, and, therefore, the meter device M provides means for enabling a rapid determination of the actual flow rate through the orifice 8, since, for a given orifice flow area, the constant pressure difference maintained by the regulator device will be productive of a constant flow rate.

The hand knob 67 may be employed for manually ascertaining that the meter piston 45 is actually free for pressure responsive shifting movement within the body 44. Moreover, it will be appreciated that the calibrated end 68 of the meter rod may, if desired, be connected to appropriate means (not shown) for directly reading out the actual rate of flow through the orifice 8.

Referring now to FIG. 3, there is illustrated a modified upstream regulator, also generally denoted as UR. This modified construction includes a regulator housing 105 connected at one end to an upstream or inlet conduit 101 by a coupling 103, and at its other end to an outlet or downstream conduit 102 by a coupling 104. As in the case of the first-described embodiment, the structure of FIG. 3 includes a regulator piston 106 provided with an orifice disc 107 having an orifice 108 therethrough, the piston 106 having a valve sleeve 109 extending axially within the housing 105. The piston 106 is slidable in the upper section of the bore 111 of the body 105 and is sealingly engaged therewith by an O-ring or other piston ring means 112. At the other end of the bore 111 is a shoulder 113 against which a spring 110 abuts confined within an annulus 110a defined between the housing 105 and the sleeve 109, the spring providing a biasing force acting to move the piston 106 in one direction in opposition to the fluid pressure force tending to move the piston 106 in the other direction. In addition, the piston 106 has an axially extended reduced diameter section 115 disposed within a bore 117 of a member 118 threaded into the end of the housing 105 and providing an adjustable stop for the piston 106, the member 118 having its inner end face 120 opposing the piston 106 so as to be engaged thereby. Likewise, the orifice disc 107 is disposed in an enlarged bore 121 in the member 115, seats against a shoulder 122 in the latter, and is retained in place by a snap ring 123.

The sleeve 109 is threadedly or otherwise suitably secured, as at 124, to the piston 106, and at its other end, it is threadedly secured to a poppet valve member 126. The poppet valve member cooperates with a valve body 128 on which the spring seating surface 113 is provided, this valve body 128 carrying a seal ring 128a sealed against the housing 105, the body 128 including an annular central passage 129 extending through an internal body flange 130 to provide a valve passage leading into a downstream valve chamber 131. This downstream chamber 131 is defined between the lower surface of the body 128 and a member 132, which has an inwardly extended skirt 133 abutting the body 128 and forming an end support therefor, as well as a central section 134 having a cylinder 135 therein closed by a bottom wall 136. Extending through an intermediate or web portion of the member 132 is a suitable number of flow passages 137 leading from the downstream valve chamber 131 into the downstream conduit 102.

The poppet valve member 126 is provided with a threaded bore 138 in which is threadedly secured an end of a poppet valve stem section 139. Interposed between the member 126 and the stem section 139, and more particularly within a groove defined by opposing portions of the latter, is a poppet valve head member 140 in the form of a ring sealed by the seal 141 within the groove. Below the head member 140, as seen in FIG. 3, the stem section 139 is reduced by the provision of a circumferential groove 142, which is arcuate in shape in the region at which it is opposed by the wall defining the valve passage 129, so as to reduce the possibility of erosive impingement of high velocity fluids containing erosive particles. At its lower end, the stem section is reduced in diameter and has supported thereon a ring 143 sealed by the seal ring 144 to the stem section, and having a cylindrical external surface slidably disposed in the cylinder 135 previously referred to. This ring is retained in place by a nut 145, which also supports a seal ring 146, sealingly and slidably disposed in the cylinder 135 referred to above, so that the lower end of the stem 139 and the ring 145 effectively constitute a piston reciprocable in the cylinder 135. The valve stem has a passageway 147 which leads from the sleeve 109 into the cylinder 135 so that the pressure downstream of the orifice 108 but upstream of the poppet valve means is applied to the annular end area of the stem exposed within the cylinder 135.

It will now be apparent that the embodiment of FIG. 3 functions in the manner of the upstream regulator UR of FIG. 1. In this connection, it will be noted that the pressure of fluid upstream of the orifice disc 107 will be applied across the entire cross-sectional area of the piston 106 and the annular area of the orifice disc 107, while the pressure downstream of the orifice disc will be applied as well to the entire cross-sectional area of the piston and the orifice disc. It will also be noted in this connection that, in addition to the area of the piston valve stem in the cylinder 135 in the bottom support of the valve exposed to the pressure downstream of the orifice, fluid flowing through the ports 126a in the poppet valve member will find access to the annular space 110a between the housing 105 and the sleeve 109 through a gap 105a defined between the poppet valve member 126 and the valve body member 128. Thus, the forces acting on the assembly to position the poppet valve means TV to more or less permit the flow of fluid through the valve passage 129 will be effective differential pressures upstream and downstream of the orifice and the spring.

In the event that the pressure upstream of the orifice 108 tends to increase, or the pressure downstream of the orifice tends to decrease, there will be a tendency for the piston 106 to be moved axially against the counter force of the spring 110, so as to move the poppet valve member 140 toward the closed position; that is, toward the flange 130, thereby restricting flow through the poppet valve and tending to increase the pressure downstream of the orifice, so as to maintain a constant pressure drop through the orifice. Conversely, if the pressure upstream of the orifice should tend to decrease, or the pressure downstream of the orifice tends to increase, there will be a larger net force including the spring 110 acting to move the piston in a direction to open the poppet valve or throttle means TV, so as to increase the permitted flow through the throttle valve, thereby tending to maintain a constant pressure drop through the orifice.

In addition, as in the case of FIG. 1, it will be understood that, if desired, a metering device such as that shown at M in FIG. 1 may be employed with the regulator of FIG. 3, taking its upstream pressure from the relatively static pressure within the coupling 103 and taking its downstream pressure from the static pressure within the stream of the orifice 308 acting across the entire annular cross-sectional area between the orifice 308 and the housing wall 311, so that, as in the case of the previous embodiments, there will be maintained a constant pressure drop across the orifice 308 and, therefore, a constant flow rate through the device.

In this connection, it will now be understood that the operation of the downstream flow regulator of FIG. 5 is such that, if pressure downstream of the orifice 308 should be reduced, or the pressure upstream of the orifice be increased, there will be a net force tending to close the throttle valve means TV due to movement of the valve sleeve 326 upwardly, as seen in FIG. 5, and conversely, if the pressure downstream of the orifice 308 should tend to increase, or the pressure upstream of the orifice tends to decrease, there will be a net force tending to open the throttle valve means. Thus, in either event there will be maintained a constant pressure drop across the orifice 308 and a constant flow rate through the apparatus.

As in the case of the embodiment of FIG. 1, it will be noted that within the piston chamber defined between the housing 305 and the internal sleeve 309 is a chamber upstream of the orifice in which the pressure is in a substantially static condition, and, in addition, within the coupling 304 in the chamber defined between the latter and the spring seat 310a, the pressure downstream of the orifice is at a comparatively static condition, so that the device of FIG. 5 also lends itself for use with a differential pressure metering device, such as that designated M in FIG. 1.

Passing now to FIG. 6, a further embodiment of a downstream regulator DR is illustrated. As in the previously described embodiments, this regulator DR includes an elongated housing 405 connected at one end to an inlet conduit 401 by a coupling 403 and connected at its other end to an outlet or downstream conduit 402 by another coupling 404. Within the housingg 405 is an annular regulator piston 406 disposed about an inner sleeve 409 and sealingly engaged therewith at 412, as well as being sealingly engaged within the inner bore 411 of the housing 405, as at 413. Effectively supported by the assembled sleeve and piston is an orifice disc 407 having an orifice 408, and which, in the illustrative embodiment, is secured to the upper end of the sleeve 409 by a snap ring 407a. A coil compression spring 410 is disposed within the annular space 410f between the housing 405 and the sleeve 409 and abuts at one end with an adjustable spring seat member 410a threadedly engaged in the housing, and having an endwise extended skirt 410b which projects axially beyond the upper extremity of the sleeve 409, so as to provide within the coupling 404 a region which will be out of the main fluid flow path, and which will contain fluid at static pressure. Connected to the sleeve 409 is a valve stem 426 forming part of a throttle valve means TV. The stem extends axially into a chamber 435 defined by a valve body 428 disposed within a bore 429 within the housing 405, and secured in place by a cross pin 427 extended transversely of and secured to the end of the housing 405. The member 428 bears against an annular member 428a disposed within the bore 429 and engaging a housing shoulder 428d, being sealed against the housing by a seal ring 428c. A valve seat 430 is formed on a ring 430a seating within and secured to the annular member 428a. The seat supporting valve body member 428 has longitudinally extended passages 431 therethrough at a suitable number of locations circumferentially thereof for the flow of fluid therethrough. At its upper end, the stem 426 is provided with web elements 426a connecting the same to a threaded ring 426b, which is, in turn, threaded to the sleeve 409 previously referred to, so as to provide flow passages 462c therethrough, as seen in FIGS. 7 and 8.

The valve stem 426 is provided with a poppet valve head 440, in the form of a ring mounted upon the stem 426, and retained in place by a spacer ring 441 sealingly engaged with the exterior of the stem and abutting the poppet valve head ring 440, the spacer 441 being retained in place by a threaded collar 442 having a flange 443 providing space for a seal engaged within the bore 435 of the valve body member 428. The valve stem 426 further has a central passage 447 therethrough leading into the chamber 435, so as to apply to the end area of the stem within the chamber 435 the pressure of fluid upstream of the orifice, which is the same pressure applied to the total annular area of the piston 406, sleeve 409, and the orifice disc 407, tending to move the throttle valve TV in a closing direction, opposed by the force of the spring 410 tending to move the valve in an open direction.

In addition to the spring force, it will be noted that a clearance space 410g is provided between the sleeve 409 and the spring seat 410a for the access of downstream fluid pressure to the annular space 410f between the housing 405 and the sleeve 409, so that fluid pressure derived from the downstream side of the orifice 408 is applied to the total annular area of the piston 406 and the sleeve 409, together with the orifice disc 407 carried by the latter.

Accordingly, it will now be understood that here again there is a regulator device provided, which includes throttle valve means which will be more or less opened as a function of the tendency of the differertial pressure across the orifice 408 to change. In other wor ls, in the event that the pressure downstream of the orifi:e 408 tends to be reudced, or the pressure upstream of the orifice tends to be increased, then there will be a net force produced tending to move the poppet valve head 440 toward its seat 430, as toward a closed position, that is, upwardly as viewed in FIG. 6. Conversely, in the event that there is increased pressure downstream of the orifice disc or decreased pressure upstream of the orifice disc, there will be a net force produced tending to move the poppet valve to the open position. Therefore, there will be maintained a constant pressure drop across the orifice 408 and a constant rate of flow through the apparatus.

It is apparent from the description of the several species of the invention that each of them, in addition to various unique structural details, includes a fluid pressure operated piston valve, wherein the piston is provided with an orifice member having a single orifice therethrough, and wherein the piston is of comparatively large surface area, so as to enable the utilization of a spring of comparatively strong force, making the assembly well suited for use in controlling the flow of fluids that may contain entrained particles.

We claim:
1. In combination: a flow regulator adapted to be installed in a flow conduit for regulating the flow therethrough at a constant rate, and metering means for indicating the flow rate through said regulator, said regulator comprising a housing having an inlet and an outlet for connecting the same in a fluid conduit, regulator means in said housing for maintaining the flow of fluid through said housing from said inlet to said outlet at a substantially constant rate, said regulator means including throttle valve means including a valve member movable in one direction to open said throttle valve means and movable in the other direction to close said throttle valve means, means for effecting such movements of said throttle valve means, means providing an orifice at one side of said throttle valve means, and means at the respective opposite sides of said orifice providing zones at which said fluid flowing through said regulator is at substantially a static pressure, and said metering means comprising differential pressure only responsive indicator means, and means connecting said indicator means to the respective zones at static pressure at opposite sides of said orifice means.

2. The combination defined in claim 1, wherein said movable valve member and said housing define an annular space therebetween, said movable valve member having a passage therethrough leading between said orifice means and said throttle valve means, passage means leading from said passage to said annular space to provide one of said static pressure zones in said annular space, and means at the other side of said orifice means having a passage therethrough for the flow of fluid through said regulator and defining said other static pressure zone.

3. The combination as defined in claim 1; said static pressure means comprising a sleeve secured to said housing and having a portion spaced laterally therefrom to define one of said zones to which said indicator means is connected.

4. The combination as defined in claim 1, wherein said movable valve member and said housing define an annular space therebetween, said movable valve member having a passage therethrough leading between said orifice means and said throttle valve means, passage means leading from said passage to said annular space to provide one of said static pressure zones in said annular space, said static pressure means further comprising a sleeve secured to said housing at the other side of said orifice means and having a portion spaced laterally from said housing to define the other of said static pressure zones to which said indicator means is connected.

5. A flow regulator comprising: a housing having a fluid inlet and a fluid outlet; a throttle valve including a valve body in said housing having a throttle passage communicating with said outlet and a valve sleeve shiftable axially in said body with respect to said throttle passage to throttle the flow of fluid therethrough, said valve sleeve having a substantially lesser external diameter than the internal diameter of an inner wall of said housing to provide an annular space therebetween; an annular piston secured to said sleeve and slidable along said inner wall; said sleeve and piston having a central flow passage communicating with said inlet and throttle passage; an orifice member fixed in said flow passage for axial movement with said sleeve and piston; a spring in said annular space engaging said piston to shift said piston and sleeve in an upstream direction to more fully open said throttle passage; means for conducting fluid downstream of said orifice member from said flow passage to said annular space; and supporting means in said housing downstream of said throttle passage engaging and supporting said valve body in said housing.

6. A flow regulator as defined in claim 5; wherein said valve body has a cylindrical bore slidably receiving said sleeve, said throttle passage comprising one or more radial ports extending through said valve body into said cylindrical bore, said supporting means having a passage therethrough for flow of fluid between said one or more radial ports and said outlet.

7. A flow regulator as defined in claim 5; wherein said throttle valve passage comprises a circumferential valve seat; said valve sleeve having a poppet valve member movable toward and from said seat to regulate the effective area of said throttle passage; said supporting means having a passage therethrough for flow of fluid from said throttle valve passage to said outlet.

8. A flow regulator comprising: a housing having fluid inlet means and fluid outlet means; a throttle valve including a valve body in said housing having a throttle passage communicating with one of said means and a valve sleeve shiftable axially in said body with respect to said throttle passage to throttle the flow of fluid therethrough, said valve sleeve having a substantially lesser external diameter than the internal diameter of an inner wall of said housing to provide an annular space therebetween; an annular piston secured to said sleeve and slidable along said inner wall; said sleeve and piston having a central flow passage communicating with said throttle passage and the other of said means; an orifice member in said flow passage movable axially with said sleeve and piston; a spring engaging said piston to shift said piston and sleeve toward said inlet means to more fully open said throttle passage; means for conducting fluid pressure from said central passage between said orifice and throttle valve to said annular space for action on said annular piston; and supporting means in said housing adjacent to one of said fluid means engaging and supporting said valve body in said housing.

9. A flow regulator as defined in claim 8; wherein said valve body has a cylindrical bore slidably receiving said sleeve, said throttle passage comprising one or more radial ports extending through said valve body into said cylindrical bore, said supporting means having a passage therebetween for flow of fluid between said one or more radial ports and said fluid means adjacent to said supporting means.

10. A flow regulator as defined in claim 8; wherein said throttle valve passage comprises a circumferential valve seat; said valve sleeve having a poppet valve member movable toward and from said seat to regulate the effective area of said throttle passage; said supporting means having a passage therethrough for flow of fluid from said throttle valve passage and said fluid means adjacent to said supporting means.

11. A flow regulator as defined in claim 8; said throttle passage communicating with said fluid inlet means; said supporting means being adjacent to said fluid inlet means.

12. A flow regulator as defined in claim 8; wherein said sleeve comprises a first section shiftable in said body and a collet section connected to said first section and piston.

References Cited

UNITED STATES PATENTS

| | | | |
|---|---|---|---|
| 1,166,980 | 1/1916 | Gehre | 73—205 |
| 2,872,939 | 2/1959 | Terry | 137—504 |
| 2,917,074 | 12/1959 | Terry | 137—504 |
| 3,170,481 | 2/1965 | Presnell | 137—504 XR |
| 3,319,717 | 5/1967 | Chenoweth | 137—504 XR |

HENRY T. KLINKSIEK, Primary Examiner

U.S. Cl. X.R.

73—205; 137—498, 504